(12) United States Patent
Cannizzaro et al.

(10) Patent No.: US 8,196,197 B2
(45) Date of Patent: Jun. 5, 2012

(54) PREVENTING TRIVIAL CHARACTER COMBINATIONS

(75) Inventors: Giovanna Cannizzaro, Rome (IT); Patrizia Manganelli, Rome (IT); Alessandro Raniolo, Rome (IT)

(73) Assignee: International Business Machines Corporation, Armonk, NY (US)

(*) Notice: Subject to any disclaimer, the term of this patent is extended or adjusted under 35 U.S.C. 154(b) by 760 days.

(21) Appl. No.: 12/270,301

(22) Filed: Nov. 13, 2008

(65) Prior Publication Data

US 2009/0133120 A1     May 21, 2009

(30) Foreign Application Priority Data

Nov. 20, 2007    (EP) ................................... 07121073

(51) Int. Cl.
*G06F 21/00*      (2006.01)
(52) U.S. Cl. .......................................... 726/18; 713/183
(58) Field of Classification Search ............... 726/18; 713/183
See application file for complete search history.

(56) References Cited

U.S. PATENT DOCUMENTS

| | | | |
|---|---|---|---|
| 6,748,544 B1* | 6/2004 | Challener et al. .............. | 726/17 |
| 7,062,655 B2 | 6/2006 | Nelson | |
| 7,562,227 B1* | 7/2009 | Cox et al. ..................... | 713/183 |
| 2003/0140258 A1* | 7/2003 | Nelson et al. ................. | 713/202 |
| 2004/0073809 A1* | 4/2004 | Wing Keong .................. | 713/201 |
| 2004/0073815 A1* | 4/2004 | Sanai et al. .................... | 713/202 |
| 2004/0139331 A1* | 7/2004 | Sanai et al. .................... | 713/184 |
| 2004/0177272 A1* | 9/2004 | Walters ......................... | 713/201 |
| 2004/0250139 A1* | 12/2004 | Hurley .......................... | 713/202 |

OTHER PUBLICATIONS

Bishop, Matt et al. "Improving system security via proactive password checking," Computers & Security, vol. 14, Issue 3, 1995, pp. 233-249.*

* cited by examiner

*Primary Examiner* — Michael Pyzocha
(74) *Attorney, Agent, or Firm* — D'Ambrosio & Menon, PLLC; Usha Menon; Srikant Viswanadham

(57) ABSTRACT

Methods, systems, and products for preventing the selection of trivial character combinations in passwords. Methods may include maintaining a database of trivial patterns representing sequences on the keyboard and independent from the starting point of the sequence. When a new password is proposed a check is done to verify if the pattern of the new password matches with an existing "forbidden" pattern and in such case it is refused by the system. Any number and kind of trivial patterns may be forbidden. The security administrator may choose patterns which should not be permitted.

20 Claims, 7 Drawing Sheets

PREVENTING TRIVIAL CHARACTER COMBINATIONS

PRIORITY

This application is based on and claims the benefit of priority from European Patent Application No. EP07121073, filed Nov. 20, 2007.

BACKGROUND

In a data processing system, it is necessary to make sure that only authorized users have access to system resources. Normally not all the users can have access to all the resources or to the same resources. It is known to create user profiles associated with a predetermined set of authorizations. Access to software and hardware resources is generally controlled by security software which grants or prevents access based on two main access control themes: authentication and authorization. Authentication verifies whether or not a person is who he claims to be, through checking userID/password combinations or similar methods. When a user fails authentication checks, he is generally prevented from accessing any of the systems. When a user is authenticated, then the user may access a pre-determined subset of the system resources, based on authorization rights. Authorization defines what an authenticated user is allowed to do in a system. Authorization may define tasks that a user is allowed to execute, it may define a subset of resources that a user may work with, or it may be a combination of the two. For better security, the system may request that a user modify the password in use after a predetermined period of time and require the password to be significantly different from the last few passwords used by the same user.

SUMMARY

Preventing trivial character combinations in passwords used for a computer system increases the security of the system. Trivial character combinations are more easily discovered by malicious users than complex passwords, particularly with the use of software assisted methods.

A password may be considered complex if it is composed of, for example, a significant number of characters, mixed characters (letters and numbers), or special characters. However, some passwords considered complex according to character rules are actually trivial, such as simple patterns of keys on the keyboard. For example, the sequence 1qwerty7 in a "qwerty" keyboard, as represented in FIG. 1a, has a recognizable pattern on the keyboard. Aspects of the present invention may include excluding trivial character sequences based on recognizable patterns on the keyboard.

Methods, systems, and products are disclosed for controlling user created passwords in a password-protected data processing system to prevent the selection of trivial passwords. The data processing system is configured to receive a proposed password as input, the proposed password comprising characters corresponding to a keyboard. The method includes converting the proposed password into a proposed password pattern according to a coding convention. The method also includes comparing the proposed password pattern with a trivial pattern. The trivial pattern includes a representation of a sequence of keys on the keyboard according to the coding convention. The method also includes determining a value indicative of a degree of similarity of the proposed password pattern to the trivial pattern in dependence upon the comparison of the proposed password pattern with the trivial pattern and disallowing the proposed password if the value exceeds a triviality threshold.

The foregoing and other objects, features and advantages of the disclosure will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1A:
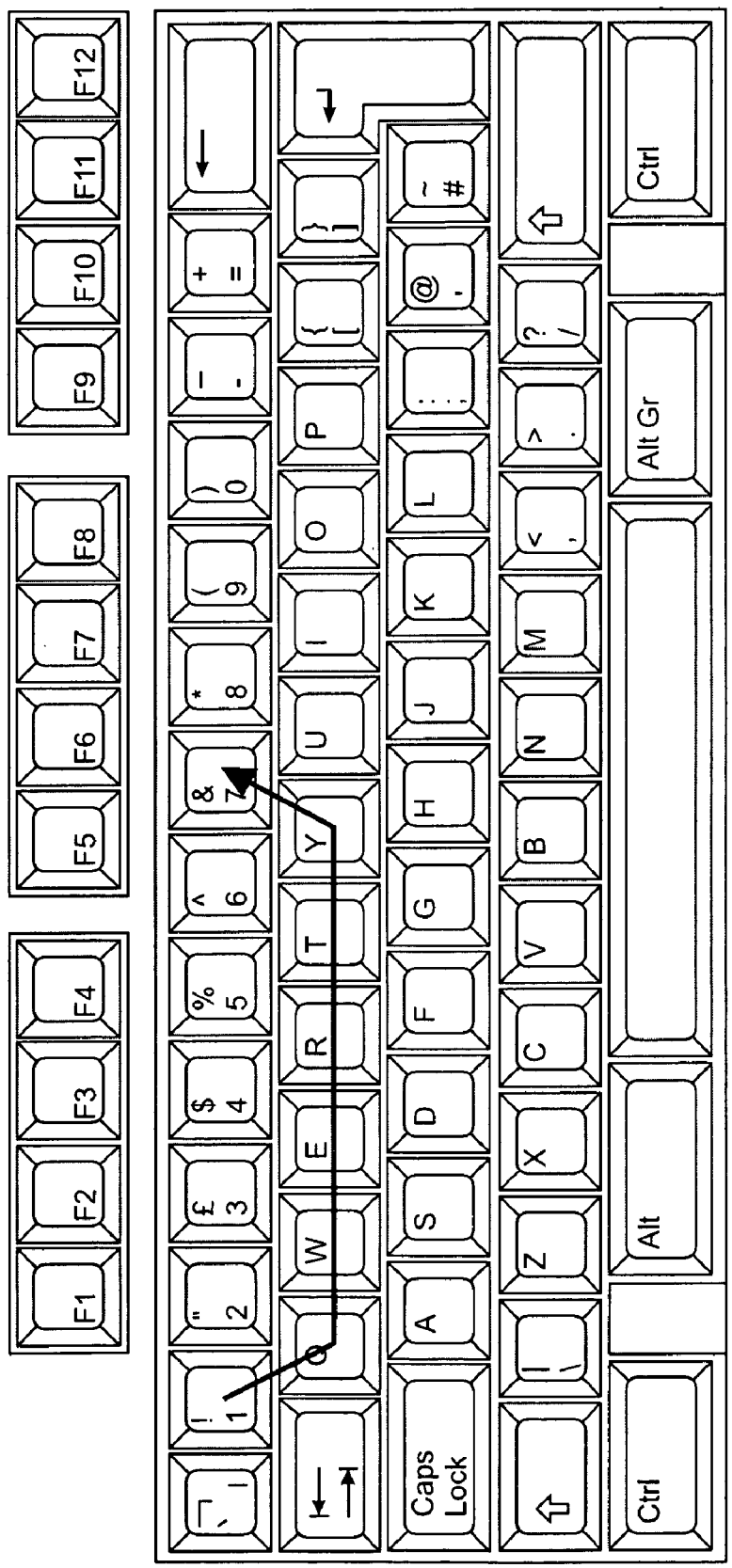
FIG. 1a is schematic representation of a "qwerty" keyboard.
Figure 1B:
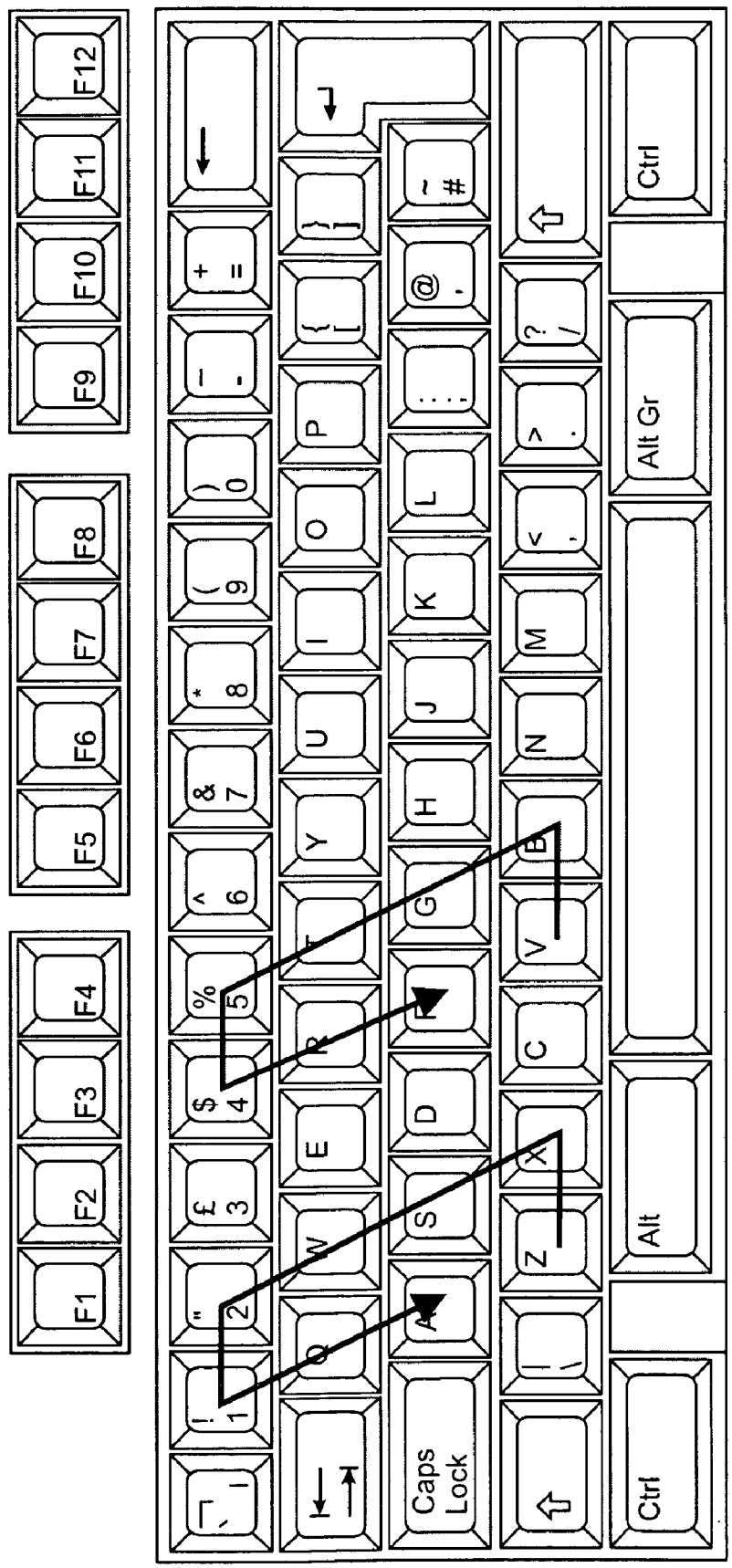
FIG. 1b is a schematic representation of forbidden patterns according to an embodiment of the present invention.

One embodiment of the present invention is a method for identifying some trivial keyboard patterns and for preventing user selection of a password matching with such pattern. Preventing selection of trivial patterns according to the present disclosure may be carried out independently of the actual keyboard used to input the password. A pattern may be identified from the starting point (independently from the starting key being selected). As an example, the sequence "zxsw21qa" in a "qwerty" keyboard represents a sort of circle, as shown in FIG. 1b. Not only is each character of the password next to the previous one, but they are also arranged in a mnemonic visual pattern. Such a pattern may be represented by the position of each character relative to its predecessor. For illustration, consider the following exemplary coding convention.

R=right,
L=left,
U=up,
D=down,
S=same character again

Under this coding convention, the sequence "zxsw21qa" can be represented as: R, U, U, U, L, D, D. However, such representation can match with several other sequences of characters, e.g. "vbgt54rf." All these sequences should be avoided because they are considered trivial. Another trivial sequence could be any sequence matching with the opposite round, e.g. the sequence "xzaq12ws." Using the above described coding convention, this sequence could be represented with L, U, U, U, R, D, D. The same representation matches with several other sequences, e.g. the sequence "mnhy67uj." The circle pattern could have a different shape (e.g. the sequence "bnmjuytg" or the sequence "loiuyhjk"), and of course the pattern could be different from a circle. Another coded pattern could be represented as R, R, R, R, R, R, R, R, which indicates any sequence of 8 contiguous characters on the same line, from left to right. It is to be noted that in the coding convention of some embodiments, this pattern is different from: L, L, L, L, L, L, L, L (8 contiguous characters from right to left).

In some aspects, the security administrator may choose any number or kind of trivial patterns which should not be permitted. Each pattern may cover a plurality of possible sequences, depending on the starting character key on the keyboard. This results in a flexible tool for enforcing the security of the managed systems.

Figure 2A:
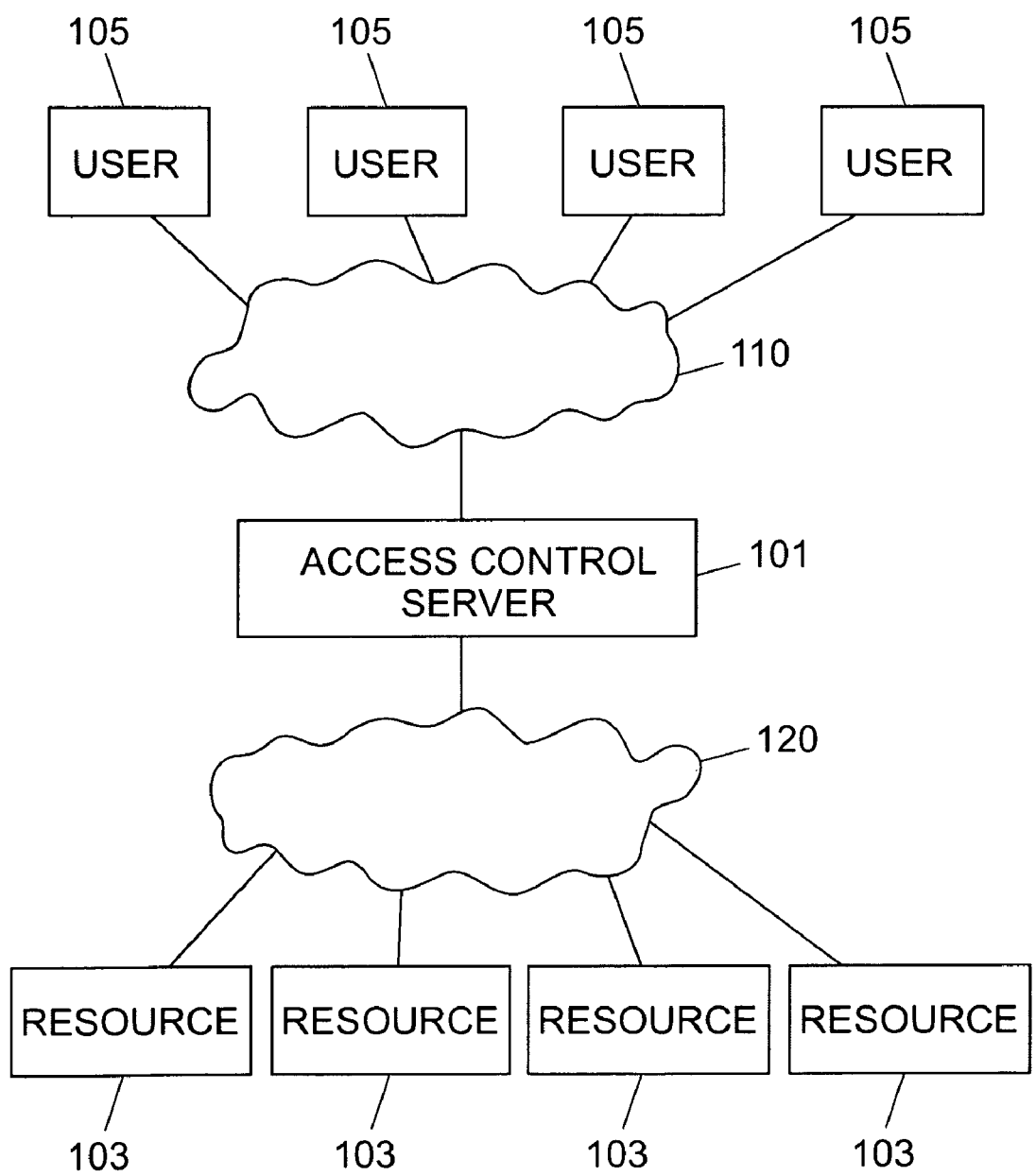
FIG. 2a is a schematic block diagram of a data processing system in which the solution according to an embodiment of the invention is applicable.

FIG. 2a is a schematic block diagram of a data processing system according to one embodiment of the invention. With reference to FIG. 2a, the system includes an Access Control Server 101 which controls a plurality of resources 103 through communications means 120 (e.g. a network, the Internet, internal computer connections). Users can request access to resources 103 through clients 105 which are connected to the server 101 by means of a network 110 (or by means of internal computer connections). Server 101 controls the access to the resources 103 according to predetermined authorization levels. The server includes a system which manages all access requests arriving from the users 105, such as, for example, a Resource Access Control Facility (hereinafter 'RACF') of International Business Machines Corporation of Armonk, N.Y. (hereinafter 'IBM'), a UNIX standard security system, or other systems as will occur to those of ordinary skill in the art. In this implementation, when a new request for accessing system resources is received, the user is prompted to enter the userID and the corresponding password. The Server looks for the userID/password pair on a database containing all authorizations and associates the corresponding profile contained in the database, where all the authorization levels associated to such profile are defined. According to the associated profile, access to the resources 103 is granted or denied. The resources may be any kind of physical or logic objects which can be controlled by a data processing system. When a new password is created, the server 101 performs triviality checks to prevent any "weak" password from being selected by the user. If the password is approved it is stored in the database accordingly.

Figure 2B:
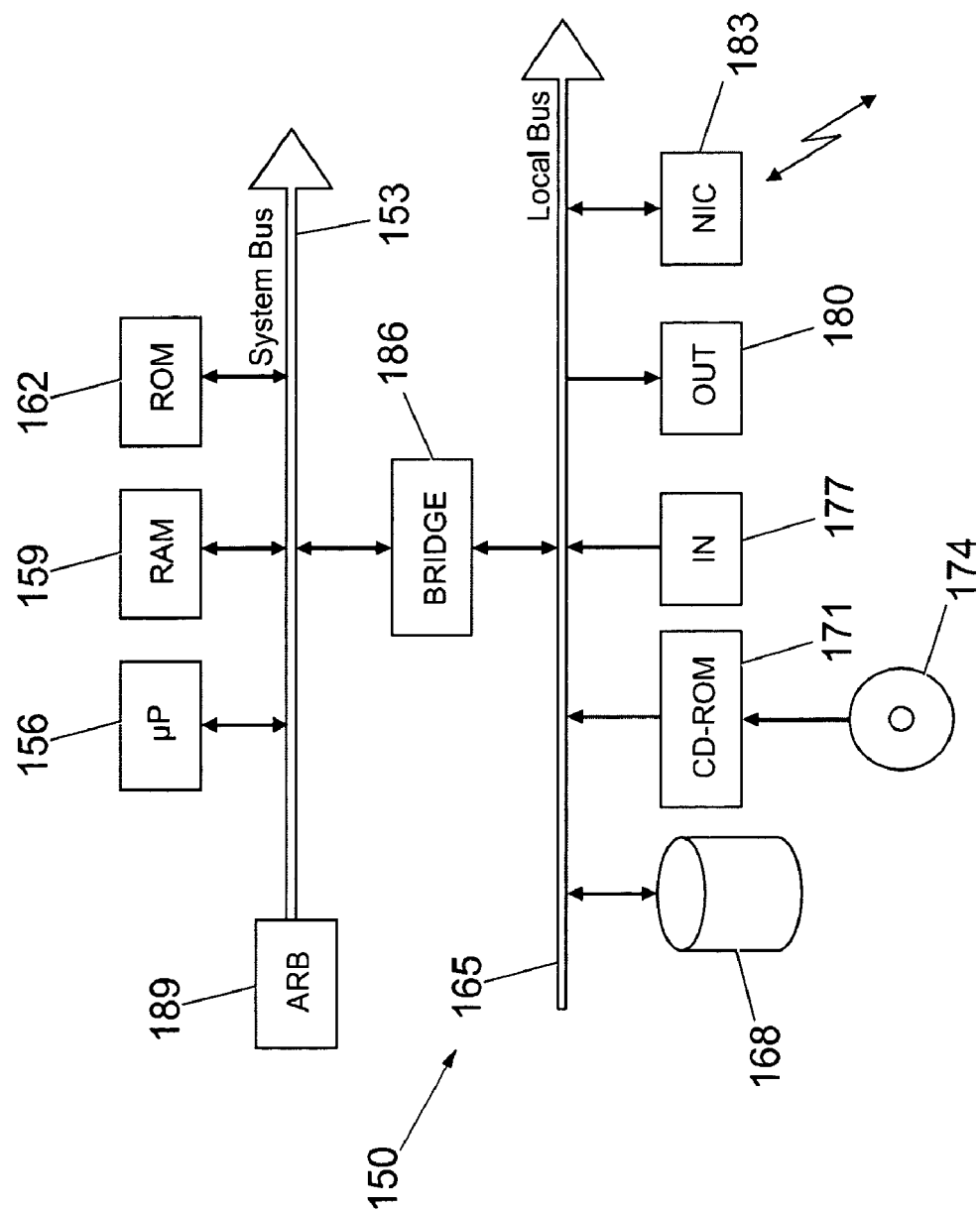
FIG. 2b shows the functional blocks of an exemplary computer of the system.

A method for controlling user created passwords to prevent the selection of trivial passwords in accordance with the present invention is generally implemented with computers, such as the Access Control Server, clients, resources, and so on. FIG. 2b shows the functional blocks of an exemplary computer according to one embodiment of the present invention. Considering now FIG. 2b, the computer 150 is formed by several units that are connected in parallel to a system bus 153 (with a structure that is suitably scaled according to the actual function of the computer 150 in the system). In detail, one or more microprocessors (hereinafter 'mP') 156 control operation of the computer 150; a RAM 159 is directly used as a working memory by the microprocessors 156, and a ROM 162 stores basic code for a bootstrap of the computer 150. Several peripheral units are connected to a local bus 165 by means of respective interfaces. Particularly, a mass storage consists of one or more hard-disks 168 and a drive 171 for reading CD-ROMs 174. Moreover, the computer 150 includes input units 177 (for example, a keyboard and a mouse), and output units 180 (for example, a monitor and a printer). A network adapter 183 is used to operatively connect the computer 150 to the system. A bridge unit 186 interfaces the system bus 153 with the local bus 165. Each microprocessor 156 and the bridge unit 186 can operate as master agents requesting access to the system bus 153 for transmitting information. An arbiter 189 manages granting of access with mutual exclusion to the system bus 153.

Figure 3:
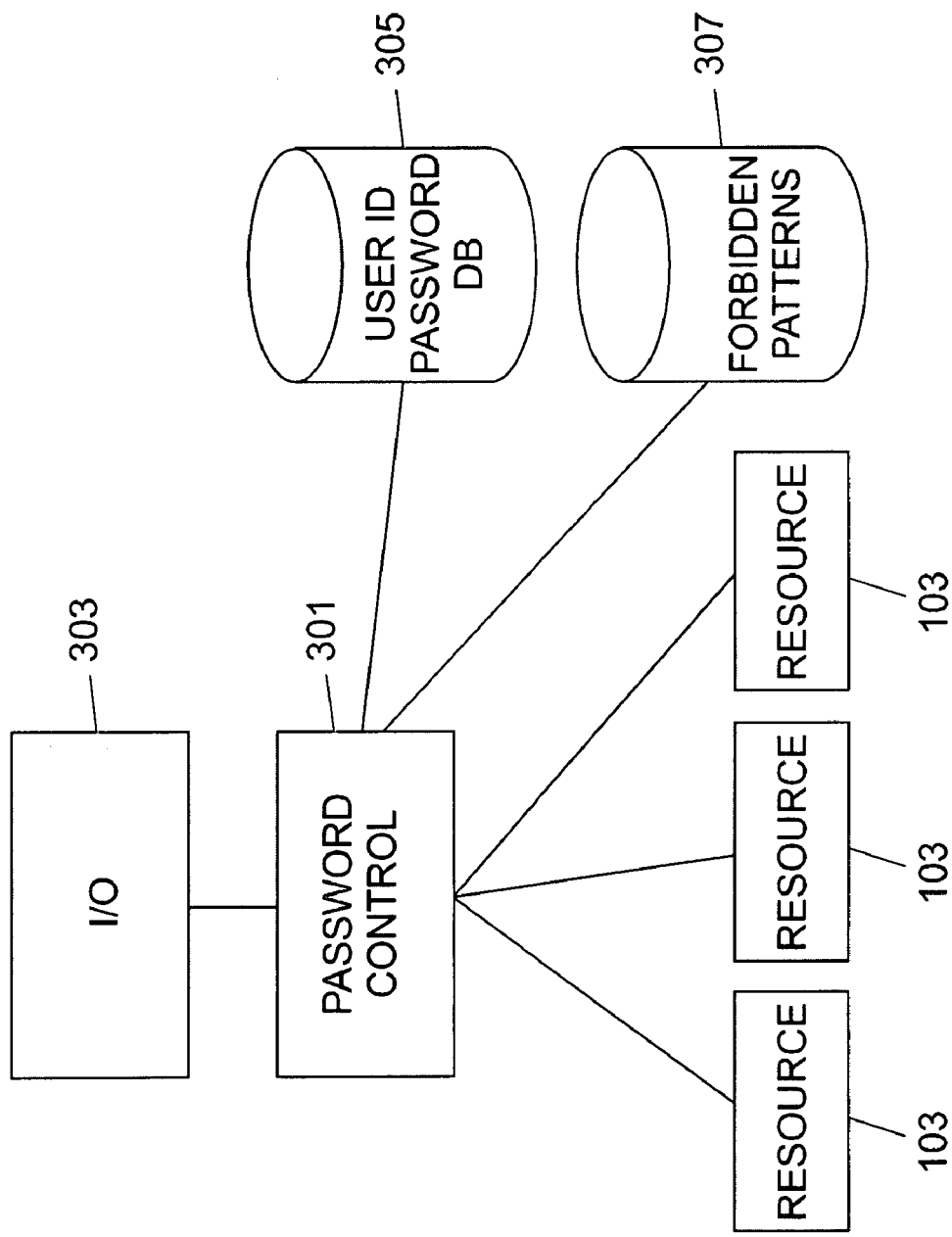
FIG. 3 depicts software components that can be used for controlling user created passwords to prevent the selection of trivial passwords according to an embodiment of the invention.

FIG. 3 depicts the main software components that can be used for controlling user created passwords in a password-protected data processing system to prevent the selection of trivial passwords according to an embodiment of the invention. Referring to FIG. 3, the information (e.g., programs and data) is typically stored on the hard-disk and at least partially loaded into the working memory of each computer when the programs are running. The programs are initially installed onto the hard disk, for example, from CD-ROM.

The module Password Control 301 includes software which manages password creation requests arriving from the I/O module 303. When the system receives a request for creating a new password (or for replacing an existing one), the system prompts the user to enter the proposed password. After having performed all usual verifications as required by the system, the Password Control module 301 identifies the pattern of the proposed password according to the coding convention and determines if the pattern of the proposed password matches a pattern in the Forbidden Patterns database 307. If the pattern of the proposed password does not match with any of the forbidden patterns, then the Password Control module 301 authorizes the new password. Password Control 301 stores authorized passwords on UserID Password DB 305 where all userID/password pairs are stored for security controls and for granting access to the system resources. If the pattern of the proposed password matches with any of the forbidden passwords, Password Control 301 disallows the proposed password. Those skilled in the art will appreciate that many different alternative implementations are possible. For example, the check on the Forbidden Patterns DB 307 may be done before undergoing the usual system verifications.

Software modules, which may be used to implement embodiments of the invention, may be structured differently than discussed above and may include additional modules or functions. The memory structures may be of other types, or may be replaced with equivalent entities, not necessarily consisting of physical storage media. The invention may be implemented in any form suitable to be used by or in connection with any data processing system, such as external or resident software, firmware, or microcode (either in object code or in source code). Moreover, the program may be provided on any computer-usable medium; the medium can be any element suitable to contain, store, communicate, propagate, or transfer the program. Examples of such medium are fixed disks (where the program can be pre-loaded), removable disks, tapes, cards, wires, fibers, wireless connections, networks, broadcast waves, and the like; for example, the medium may be of the electronic, magnetic, optical, electromagnetic, infrared, or semiconductor type.

Figure 4:
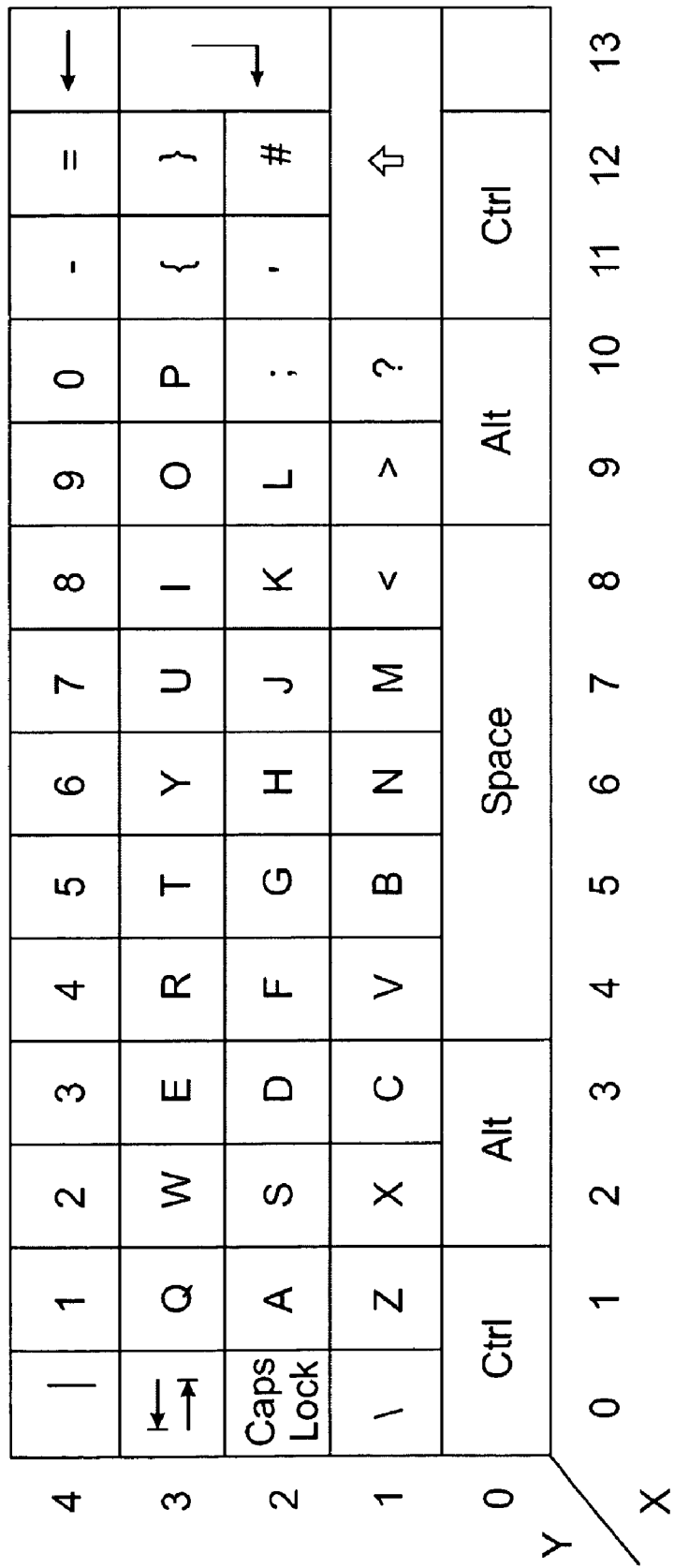
FIG. 4 shows an example of a representation of a keyboard with Cartesian coordinates.

As shown in FIG. 4, the coding convention may include mapping the keyboard using a Cartesian representation, i.e. each key is identified by (X,Y) coordinates. The list of forbidden patterns is stored in the database 307, as shown in FIG. 3. When a user enters a password, Password Control 301 maps each character with the corresponding (X,Y) coordinates according to the keyboard representation. Password Control 301 also retrieves the list of forbidden sequences from database 307.

Consider the forbidden pattern R, U, U, U, L, D, D. If a key's coordinates are expressed generically as $(X_i, Y_i)$, then:

($X_i-1, Y_i$) is the corresponding contiguous key on the left;
($X_i+1, Y_i$) is the corresponding contiguous key on the right;
($X, Y_i-1$) is the corresponding contiguous down key; and
($X, Y_i+1$) is the corresponding contiguous upper key.

If a key is on the boundary of the keyboard, obviously some contiguous upper or down or right or left key may not exist.

Representing the password sequence keys as p1, p2, ... pn, according to one implementation of the present invention, the (X,Y) coordinate of p1 is determined (e.g. by means of a lookup table), followed by the (X,Y) coordinate of p2, and so on, until determining the X, Y coordinate of pn. Patterns may be ruled out upon determining a non-matching coordinate. For example, upon determining the (X,Y) coordinate of p2, it is possible to determine that the proposed password does not match with the forbidden pattern R, U, U, U, L, D, D. If the first "movement" from p1 to p2 matches with the pattern (i.e., if the coordinates of p2 are equal to p1 (X1+1,Y1)), the next movement between p2 and p3 is checked, and so on. Password Control 301 compares the pattern of the proposed password with each stored forbidden pattern, repeating the same method described above, until finding a match or until all forbidden patterns have been checked. If Password Control 301 determines the proposed password matches one of the forbidden patterns, Password Control 301 disallows the password and prompts the user for a new password proposal.

The number and the possible format of forbidden patterns are unlimited. In some implementations, the forbidden patterns may be selected by the security administrator. Any kind of pattern could be included in the forbidden list, without limiting to adjacent keys, such as extreme opposite keys on the keyboard and the like. Other coding conventions could be used in addition to or in the alternative to the coding convention discussed above. Also, the method can be tuned so that even a subset of the pattern can be identified. As an example, if only the substring (p3, p4, p5, p6) of the proposed password matches with a forbidden pattern, the system does not authorize such password. All the parameters (e.g., length of substring to be checked, length of subpattern to be matched) may be modifiable by the administrator. Those skilled in the art will understand that many different embodiments could be implemented to adapt to the various needs.

Figure 5:
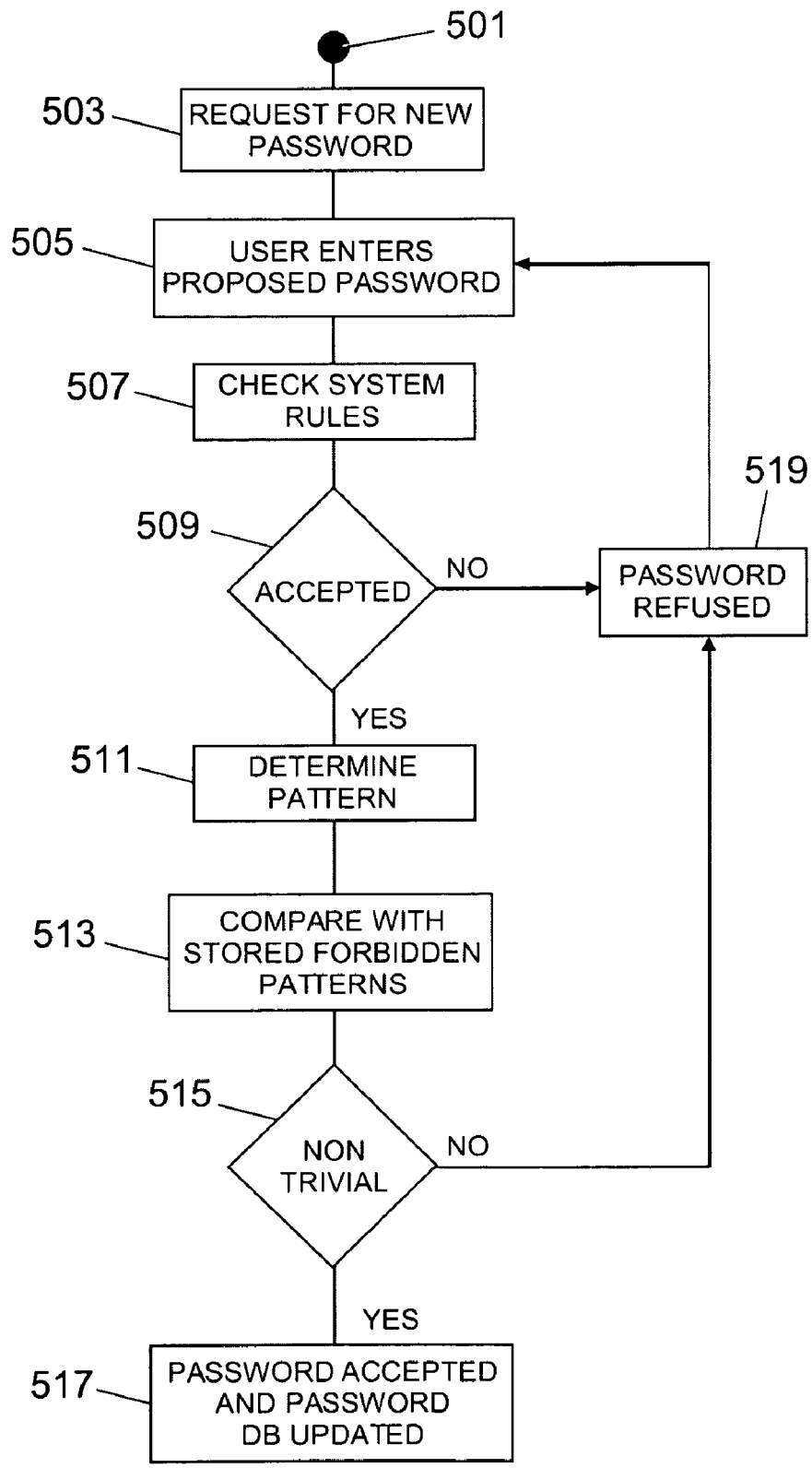
FIG. 5 is a flowchart illustrating a method for controlling user created passwords to prevent the selection of trivial passwords according to an embodiment of the invention.

FIG. 5 is a flowchart illustrating a method for controlling user created passwords in a password-protected data processing system to prevent the selection of trivial passwords according to an embodiment of the invention. With reference now to FIG. 5, the method begins at the start circle 501. The method includes receiving a request for a new password (e.g. a user request) (block 503). The method also includes prompting the user to enter a proposed password (block 505), after which the method checks compliance with system rules (block 507). If the proposed password does not comply with any of the rules (e.g., allowed characters, minimum or maximum size, similarity to a recent previous password of the same user) (block 509) the password is refused (block 519) and the control goes back to block 505 where the method includes prompting the user to propose a new password.

The method also includes, if the password complies with the system rules, determining a pattern of the proposed password (block 511) and comparing the proposed password pattern with a trivial pattern (block 513). Determining the pattern of the proposed password (block 511) is carried out by converting the proposed password into a proposed password pattern according to a coding convention. In the embodiment of FIG. 5, the trivial pattern is one of a collection of one or more stored forbidden patterns, as described above. The trivial pattern may be a representation of a sequence of keys on the keyboard according to the coding convention. As mentioned above, the number, the size and even the way this comparison is performed depend only on the predetermined rules and parameters which can be customized according to administrator needs.

The method further includes determining if the proposed password is trivial or non-trivial (block 515). Determining if the password is trivial may be carried out by determining if the proposed password pattern matches a trivial pattern. A password may be determined as non-trivial if, for example, no match with forbidden patterns has been identified. If the proposed password is determined to be non-trivial, then the proposed password is accepted and it is stored in the password database for future reference and authorization requests (block 517). If the proposed password is determined to be trivial, the password is disallowed (block 519) and the control goes back to block 505 for a new proposal by the user.

Determining if the password is trivial may include determining a value indicative of a degree of similarity of the proposed password pattern to the trivial pattern in dependence upon the comparison of the proposed password pattern with the trivial pattern. In such implementations, if the value exceeds a triviality threshold the proposed password is determined to be trivial, and thus, the proposed password is disallowed.

Those skilled in the art will appreciate that several modifications can be done to the above described method steps to adapt to the administrator's or to system needs. The components of the method described above are listed in no specific order. For example, determining if the password is non-trivial (block 515) may be performed before checking compliance with system rules (block 509).

In order to satisfy local and specific requirements, a person skilled in the art may apply to the solution described above many modifications and alterations. Particularly, although particular embodiments in the present disclosure have been described with a certain degree of particularity, it should be understood that various omissions, substitutions and changes in the form and details as well as other embodiments are possible. Moreover, it is expressly intended that specific elements and/or method components described in connection with any disclosed embodiment of the invention may be incorporated in any other embodiment.

Particularly, similar considerations apply if the system has a different architecture or includes equivalent units. For example, the resources could be physically placed on the same data base. The keyboard used for the examples above is a "qwerty" keyboard, but any keyboard of any kind and based on any language could be used instead. Each computer may have different structures or may include similar elements. Such elements may include cache memories temporarily storing the programs or parts thereof to reduce the accesses to the main memory during execution. Further, it is possible to replace the computer with any code execution entity, such as a PDA, a mobile phone, and the like.

It should be readily apparent that the implementation of the present invention is not limited to any specific application and/or technique for verifying the userID and the password. For example, it is possible to use other Access Control applications and to implement different user access policies.

It should be understood that the inventive concepts disclosed herein are capable of many modifications. To the extent such modifications fall within the scope of the appended claims and their equivalents, they are intended to be covered by this patent.

What is claimed is:

1. A computer-implemented method for controlling user created passwords in a password-protected data processing system to prevent the selection of trivial passwords, the data processing system comprising at least one processor that performs at least one of the steps of the method, the data processing system being configured to receive a proposed password comprising characters corresponding to keys of a keyboard as an input, the method comprising:
- converting the proposed password into a proposed password pattern according to a coding convention;
- using the proposed password pattern to compare a relative position of at least one pair of adjacent characters in the proposed password with a corresponding at least one element of a trivial pattern comprising a plurality of elements to determine a value indicative of a degree of similarity of the proposed password pattern to the trivial pattern, the plurality of elements of the trivial pattern representing a plurality of sequences of keys on the keyboard according to the coding convention, the plurality of elements of the trivial pattern comprising a plurality of positional relationships of keys on the keyboard; and
- disallowing the proposed password if the value exceeds a triviality threshold.

2. The method of claim 1 further comprising maintaining a list comprising at least one trivial pattern.

3. The method of claim 1 wherein the coding convention comprises an indication of a relative position of neighboring keys on the keyboard.

4. The method of claim 3 wherein the coding convention comprises a mapping of absolute positions of characters on the keyboard to positions on a Cartesian map.

5. The method of claim 4 wherein the trivial pattern represents a sequence of neighbor keys on the keyboard, the relative position of each neighbor key being at a distance on the Cartesian map not greater than 1 on the X axis and not greater than 1 on the Y axis.

6. The method of claim 1 wherein the value indicative of a degree of similarity of the proposed password pattern to the trivial pattern is determined by identifying a portion of the proposed password that matches the trivial pattern.

7. The method of claim 1 wherein the value indicative of a degree of similarity of the proposed password pattern to the trivial pattern is determined by identifying a portion of the proposed password that matches a portion of the trivial pattern.

8. A system for controlling user created passwords in a password-protected data processing system to prevent the selection of trivial passwords, the system being configured to receive a proposed password comprising characters corresponding to a keyboard as an input, the system comprising:
- a processor; and
- a computer memory operatively coupled to the processor; wherein the computer memory has disposed therein:
    - computer program instructions for converting the proposed password into a proposed password pattern according to a coding convention;
    - computer program instructions for using the proposed password pattern to compare a relative position of at least one pair of adjacent characters with at least one element of a trivial pattern comprising a plurality of elements to determine a value indicative of a degree of similarity of the proposed password pattern to the trivial pattern, the plurality of elements of the trivial pattern representing a plurality of sequences of keys on the keyboard according to the coding convention, the plurality of elements of the trivial pattern comprising a plurality of positional relationships of keys on the keyboard; and
    - computer program instructions for disallowing the proposed password if the value exceeds a triviality threshold.

9. The system of claim 8 wherein the computer memory has disposed within it a list comprising at least one trivial pattern.

10. The system of claim 8 wherein the coding convention comprises an indication of a relative position of neighboring keys on the keyboard.

11. The system of claim 10 wherein the coding convention comprises a mapping of absolute positions of characters on the keyboard to positions on a Cartesian map.

12. The system of claim 11 wherein the trivial pattern represents a sequence of neighbor keys on the keyboard, the relative position of each neighbor key being at a distance on the Cartesian map not greater than 1 on the X axis and not greater than 1 on the Y axis.

13. The system of claim 10, wherein the proposed password pattern comprises a plurality of elements, each element indicating a relative position on the keyboard of a pair of adjacent characters in the proposed password.

14. The system of claim 11, wherein the proposed password is converted to the proposed password pattern by mapping each character in the proposed password to an X-coordinate and a Y-coordinate on the Cartesian map, and
- the computer program instructions for using the proposed password pattern further comprise instructions for comparing at least one of: a difference in the X-coordinates of a pair of adjacent characters and a difference in the Y-coordinates of the pair of adjacent characters to an element of the trivial password.

15. A computer program product for controlling user created passwords in a password-protected data processing system to prevent the selection of trivial passwords, the system being configured to receive a proposed password comprising characters corresponding to a keyboard as an input, the computer program product comprising a non-transitory computer readable medium having disposed therein computer program instructions comprising:
- computer program instructions for converting the proposed password into a proposed password pattern according to a coding convention;
- computer program instructions for using the proposed password pattern to compare a relative position of at least one pair of adjacent characters in the proposed password with at least one element of a trivial pattern comprising a plurality of elements to determine a value indicative of a degree of similarity of the proposed password pattern to the trivial pattern, the plurality of elements of the trivial pattern representing a plurality of sequences of keys on the keyboard according to the coding convention, the plurality of elements of the trivial pattern comprising a plurality of positional relationships of keys on the keyboard; and
- computer program instructions for disallowing the proposed password if the value exceeds a triviality threshold.

16. The computer program product of claim 15 wherein the coding convention comprises an indication of a relative position of neighboring keys on the keyboard.

17. The computer program product of claim 16 wherein the coding convention comprises a mapping of absolute positions of characters on the keyboard to positions on a Cartesian map.

18. The computer program product of claim 17 wherein the trivial pattern represents a sequence of neighbor keys on the keyboard, the relative position of each neighbor key being at a distance on the Cartesian map not greater than 1 on the X axis and not greater than 1 on the Y axis.

19. The computer program product of claim 15 wherein the value indicative of a degree of similarity of the proposed password pattern to the trivial pattern is determined by identifying a portion of the proposed password matching the trivial pattern.

20. The computer program product of claim 15 wherein the value indicative of a degree of similarity of the proposed password pattern to the trivial pattern is determined by identifying a portion of the proposed password matching a portion of the trivial pattern.

* * * * *